3,598,522
CONVERSION OF POTASSIUM-MAGNESIUM DOUBLE SALTS INTO KAINITE
William J. Lewis, South Ogden, Utah, assignor to National Lead Company, New York, N.Y.
Filed July 18, 1968, Ser. No. 745,904
Int. Cl. C01d *5/12, 11/00;* C01f *5/00*
U.S. Cl. 23—50                                                         6 Claims

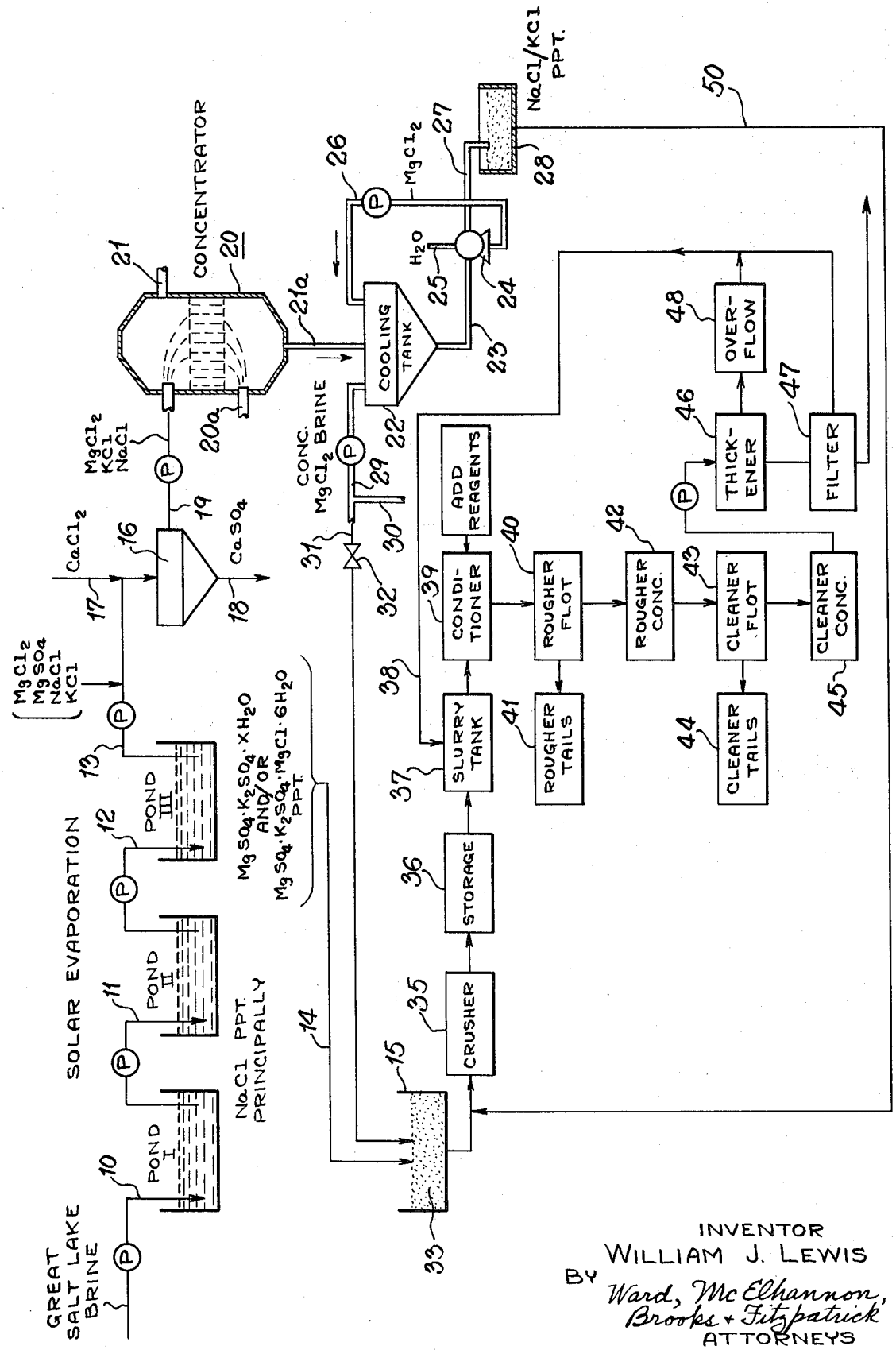

ABSTRACT OF THE DISCLOSURE

Method of converting double salts of potassium and magnesium, such as leonite and picromerite, into kainite, comprising moistening said double salt with an aqueous solution of magnesium chloride, preferably to the extent of at least 10% by weight thereof, said magnesium chloride solution containing preferably at least 20% by weight of said chloride, and aging at temperature of about 25–40° C. for a period sufficient to effect said conversion, preferably for a period of at least 48 hours.

---

This invention pertains to improvements in the selective recovery of salts from aqueous salt solutions containing a plurality of water-soluble salts, such as the chlorides and sulfates of sodium, potassium, magnesium, etc. The invention is more particularly concerned with the selective recovery of magnesium and potassium values from naturally occurring brines as found in the oceans, inland seas, salt lakes, salt wells and the like, disposed about the earth's surface.

Such brines, as aforesaid, in general contain sodium chloride as the major constituent, together with lesser but nevertheless substantial amounts of the chlorides and/or sulfates of potassium and magnesium as the principal remaining salts.

Although such salts are important industrially as well as necessary to all forms of life, their isolation and recovery from naturally occurring brines is in many instances not the most economical way of obtaining the same as compared to other sources of supply, because problems of selective recovery of desired salts from the brines are in general involved and also in general the evaporation of the aqueous solvent in successive stages is quite expensive except where waste heat from industrial plants is available or where solar evaporation may be employed.

Where, however, solar evaporation is available throughout a substantial portion of the year and where the concentration of salts in the naturally occurring brine source is high, it becomes commercially feasible to recover therefrom in accordance with the invention, such strategically important salts as magnesium chloride for use in the production of chlorine gas and metallic magnesium by electrolysis; and also potassium sulfate for use as a fertilizer, among other applications.

Fractional crystallization by solar evaporation of brines similar in composition to those of the Great Salt Lake in Utah, yields first principally common salt, NaCl, and then a mixture of common salt with various complex salts. When these complex salts are harvested for treatment to recover potassium and magnesium values, the first treatment step is ordinarily one selected to eliminate the contaminating common salt, sodium chloride. A conventional way of doing this is by flotation.

Under most conditions of solar evaporation, the crude harvest salts will consist almost entirely of a mixture of kainite and common salt. Peculiar climatic conditions may, however, produce crude salts which are relatively high in leonite or picromerite. Leonite and picromerite are both double salts of potassium and magnesium sulfate and differ only by the amount of water of crystallization present, i.e., leonite, $MgSO_4 \cdot K_2SO_4 \cdot 4H_2O$ and picromerite, $$MgSO_4 \cdot K_2SO_4 \cdot 6H_2O$$

Also, kainite may be considered as the same double salt with the addition of magnesium chloride, i.e., $$MgSO_4 \cdot K_2SO_4 \cdot MgCl_2 \cdot 6H_2O$$

These facts become important particularly as regards flotation processing of such crude complex salts, because whereas kainite floats readily and easily, I have found that leonite and picromerite do not.

I have discovered, however, in accordance with the present invention, that if such complex crude salts containing leonite and/or picromerite are moistened with a small amount of a brine, about 10% by weight or less, which is high in $MgCl_2$, and allowed to age at room temperature or somewhat above that, the leonite and/or picromerite values will be converted to kainite.

Brines which I have found effective are those containing about 20% or more by weight of $MgCl_2$, the higher the magnesium chloride concentration the more rapid the conversion. A suitable temperature range for effecting the conversion is about 25 to 40° C. or about 75 to 100° F., i.e., room temperature and somewhat above. Effective aging times range from about two days to a week, or about 48 to 72 hours or more, the aging rate increasing with temperature, with corresponding decrease in aging time. I have found that in some instances the crude complex salt contains sufficient $MgCl_2$ that merely moistening with water and aging suffices for effective conversion with sufficient aging. But generally speaking, treatment with a fairly concentrated solution of $MgCl_2$ gives most efficacious results in a minimum of aging time.

An economical source of $MgCl_2$ containing brine for use in effecting the conversion is the mother liquor from which the complex salts are precipitated. However, this brine in general, contains substantial amounts of magnesium sulfate, which after desulfation and optimally also thereafter further concentrating, is more effective for purposes of the invention.

By way of exemplifying the invention, complex harvest salts obtained in the manner above described from the Great Salt Lake over a period of about ten weeks in early spring and summer, turned out to be a mixture of picromerite, sodium chloride and a small amount of kainate. Chemical and X-ray analyses showed these salts to comprise on a dry basis about 8.8% kainate, 45.5% NaCl and 45.5% picromerite. It was found that the common salt could not be flotation separated from the complex salts by conventional procedures, as for example, by the use of long chain fatty acid amine acetates or chlorides as floating agents employed in conjunction with aliphatic alcohol frothing agents. It was found, however, that when successive batches of the harvest salts taken over weekly intervals were moistened to the extent of about 10% by weight with the mother liquor from the harvest salts and aged several days at 37½° C., that excellent flotation purification was obtained and that X-ray analysis showed the concentrate to be principally kainite and the tailings to consist principally of common salt.

A typical analysis of the flotation runs thus obtained is the following:

ION BALANCE

|  | Heads | Cleaner conc. | Cleaner tails | Rougher tails |
|---|---|---|---|---|
| Weight | 481.00 | 224.00 | 96.00 | 161.00 |
| Weight percent | 99.99 | 46.56 | 19.95 | 33.47 |
| Na, percent | 14.86 | 3.40 | 10.69 | 33.30 |
| Na, weight | 71.49 | 7.61 | 10.26 | 53.61 |
| Na, dist. percent | 99.99 | 10.65 | 14.35 | 74.99 |
| Mg, percent | 6.16 | 8.98 | 6.97 | 1.76 |
| Mg, weight | 29.64 | 20.11 | 6.69 | 2.83 |
| Mg, dist. percent | 99.99 | 67.86 | 22.57 | 9.56 |
| K, percent | 8.44 | 13.46 | 8.67 | 1.33 |
| K, weight | 40.61 | 30.15 | 8.32 | 2.14 |
| K, dist. percent | 99.99 | 74.23 | 20.49 | 5.27 |
| $SO_4$, percent | 23.79 | 37.63 | 23.46 | 4.76 |
| $SO_4$, weight | 114.47 | 84.29 | 22.52 | 7.66 |
| $SO_4$, dist. percent | 99.99 | 73.63 | 19.67 | 6.69 |
| Cl, percent | 31.99 | 19.20 | 28.32 | 52.00 |
| Cl, weight | 153.91 | 43.00 | 27.18 | 83.72 |
| Cl, dist. percent | 99.99 | 27.94 | 17.66 | 54.39 |
| $H_2O$, percent | 14.73 | 17.33 | 21.89 | 6.85 |
| $H_2O$, weight | 70.86 | 38.81 | 21.01 | 11.02 |
| $H_2O$, dist. percent | 99.99 | 54.78 | 29.65 | 15.56 |

See the following table:

| | |
|---|---|
| Percent Mg lost in rougher tails | 9.56 |
| Percent K lost in rougher tails | 5.27 |
| Percent Na rejected in rougher tails | 74.99 |
| Percent Na left in cleaner conc | 3.40 |
| Percent Cl available in cleaner conc | 13.95 |

X-ray analysis: Cleaner conc.=Kainite; halite.

The above data demonstrates that the picromerite content of the harvest salts was completely or wholly converted to kainite prior to the flotation run, as evidenced by the fact that the magnesium and potassium values are predominately concentrated in the cleaner concentrate and the sodium content largely eliminated therefrom and concentrated in the tailings.

Reference will now be had to the accompanying drawing, which illustrates diagrammatically and in flow sheet form, an application of the invention to the processing of brine of the Great Salt Lake for selective recovery of potassium and magnesium values.

The lake brine is pumped over a line 10 into a pond I and subjected to solar evaporation until salt precipitation occurs, which is principally sodium chloride. The mother liquor is pumped thence over a line 11 into a second pond II and again subjected to solar evaporation until salt precipitation occurs, which also is principally sodium chloride. The mother liquid is pumped thence over a line 12 into a third pond III and subjected to solar evaporation until salt precipitation occurs, which in this case is a crude complex salt consisting of one or more of the double salts kainite, picromerite and leonite in admixture with other salts, principally sodium chloride, and smaller amounts of chlorides of potassium, lithium, etc. The mother liquor is drawn off over a line 13, and the complex crude salt mixture harvested and deposited as indicated at 14 in an open container 15.

Meantime, the mother liquor from pond III is fed over line 13 into a thickener 16, into which line is also fed calcium chloride via connecting line 17. The calcium chloride desulfates the mother liquor by reaction with the $MgSO_4$ therein to precipitate $CaSO_4$ which is drawn off from the base of the thickener as indicated at 18. The supernatant liquor consisting principally of $MgCl_2$, KCl and NaCl in solution, is drawn off over line 19 and fed into a concentrator 20 supplied with hot gasses over line 20a and existing via line 20b, which evaporates a large portion of water from the entering brine. The hot concentrated brine flows by gravity from the base of the reactor via line 21 into a cooling tank 22. In the cooling tank, the brine is cooled substantially to ambient temperature, as a result of which the potassium chloride values precipitate as the salt carnallite ($KCl \cdot MgCl_2 \cdot 6H_2O$) along with the residual NaCl values. A slurry of the carnallite is drawn off through a drain line 23 at the base of the tank, and fed through a rotary drum vacuum filter 24, washed with water as at 25, for displacing adhering mother liquor and for dissolving the $MgCl_2$ values of the carnallite, which are recycled to the cooling tank via line 26. The washed precipitate containing essentially KCl and NaCl is flushed from the filter and delivered over line 27 into a storage tank 28.

The $MgCl_2$ brine from the cooling tank is drawn off over a line 29 and thence over a connecting line 30 for further processing as discussed below. Also, in accordance with the present invention, a portion of the $MgCl_2$ brine is fed as required over a connecting line 31 and through a valve 32 into the tank 15, which contains the crude harvest salt from pond III. Only a sufficient amount of the concentrated magnesium chloride brine is thus fed into the reservoir 15 to moisten the crude salt admixture 33, the brine being supplied to the extent of about 10% by weight of the crude salt mixture. The thus moistened salt admixture is then permitted to age for two or three days in order for the magnesium chloride solution to convert any leonite or picromerite contained therein into kainite. After thus aging, the salt admixture 33 is passed through a crusher 35, thence into a storage tank 36 and thence into a slurry tank 37, wherein it is slurried with a salt solution supplied over line 38 and obtained as described below.

From the slurry tank the slurry is fed into a conditioner 39 wherein flotation and frothing agents are added as above discussed, and the so conditioned slurry fed thence into a rougher flotation cell 40 wherein it is subjected to rougher flotation concentration, the rougher tails from which pass off as at 41, and the rougher concentrate from which passes off as at 42 and is fed thence into a cleaner flotation cell 43. In the cleaner cell, the slurry is subjected to cleaner flotation, the cleaner tails passing off as at 44 and the cleaner concentrate as at 45, being pumped thence into a thickener 46. The concentrate from the thickener passes thence under gravity from the base of the thickener into a filter 47, while the overflow liquor passes as indicated at 48 over the line 38 into the slurry tank 37, as above referred to.

Meantime, the NaCl/KCl precipitate collected in the storage reservoir 28 is fed along with the treated complex salt 33 into the crusher 35 over a line 50 for flotation concentration along with the crude kainite salt.

As described in copending application of R. P. Smith, Ser. No. 646,079, filed June 14, 1967, of common ownership with the instant application, the concentrated magnesium chloride brine supplied over line 30 may be further concentrated in a second concentrator similar to 20, and thence spray dried to provide a magnesium chloride powder, which may then be further processed as described in said application to provide an anhydrous magnesium chloride feed material for electrolytic cells in the production of metallic magnesium.

Also, as described in a copending application of L. W. Ferris, Ser. No. 400,994, filed Oct. 2, 1964, now U.S. Patent 3,432,258, of common ownership with the instant application, the potassium sulfate containing precipitate from the filter 47 may be further processed for recovering potassium values by roasting in the presence of steam at about 1250° F., water slurrying the calcinate and filtering to separate the potassium sulfate values from the resultant magnesium oxide values, and subjecting the filtrate to fractional distillation for recovering potassium sulfate values.

As shown in the flow sheet drawing, the preferred source for the magnesium chloride solution for converting the leonite and/or picromerite values to kainite is that supplied from the cooling tank 22 over line 31. However, as stated at the outset, the mother liquor from pond III drawn off over line 13 may be employed for this purpose, as may also the desulfated brine drawn off from the thickener 16 over line 19.

What is claimed is:

1. The method of converting a solid double sulfate salt selected from the group consisting of leonite, picromerite and mixtures thereof into kainite salt which comprises, moistening said solid salt with water to the extent of less than about 10% by weight in the presence of at least 20% by weight of magnesium chloride salt, and thereafter aging at temperature of about 25–40° C. for a period sufficient to effect said conversion.

2. The method according to claim 1 wherein said double salt is moistened to the extent of about 10% by weight with an aqueous solution of magnesium chloride containing at least 20% by weight of said chloride.

3. The method according to claim 1 wherein said aging extends over a period of at least 48 hours.

4. The method of processing an aqueous brine containing chloride and sulfate salts of sodium, potassium and magnesium, which comprises: concentrating said solution predominantly to precipitate sodium chloride, separating said precipitate and concentrating the mother liquor to precipitate in impure solid state, a complex salt selected from the group consisting of leonite, picromerite and mixtures thereof, moistening said salt to the extent of less than about 10% by weight with aqueous medium in the presence of at least about 20% by weight of magnesium chloride and aging at about 25–40° C. to convert said complex double salt into impure kainite salt, and purifying said kainite salt by flotation concentration.

5. The method according to claim 4 wherein said complex salt is moistened to the extent of about 10% by weight with an aqueous solution of magnesium chloride containing at least 20% by weight of said chloride.

6. The method according to claim 5 wherein said aging extends over a period of at least 48 hours.

References Cited

UNITED STATES PATENTS

| | | | |
|---|---|---|---|
| 2,862,788 | 12/1958 | Stanley et al. | 23—38 |
| 2,687,339 | 8/1954 | Dancy et al. | 23—38 |
| 3,004,826 | 10/1961 | Marullo et al. | 23—121X |
| 3,484,195 | 12/1969 | Lewis et al. | 23—121 |
| 3,489,513 | 1/1970 | Ferris | 23—121 |

HERBERT T. CARTER, Primary Examiner

U.S. Cl. X.R.

23—38